FLUID DEVICE FOR STABILIZING THE POSITION OF A MOVING ELEMENT
Original Filed April 21, 1970
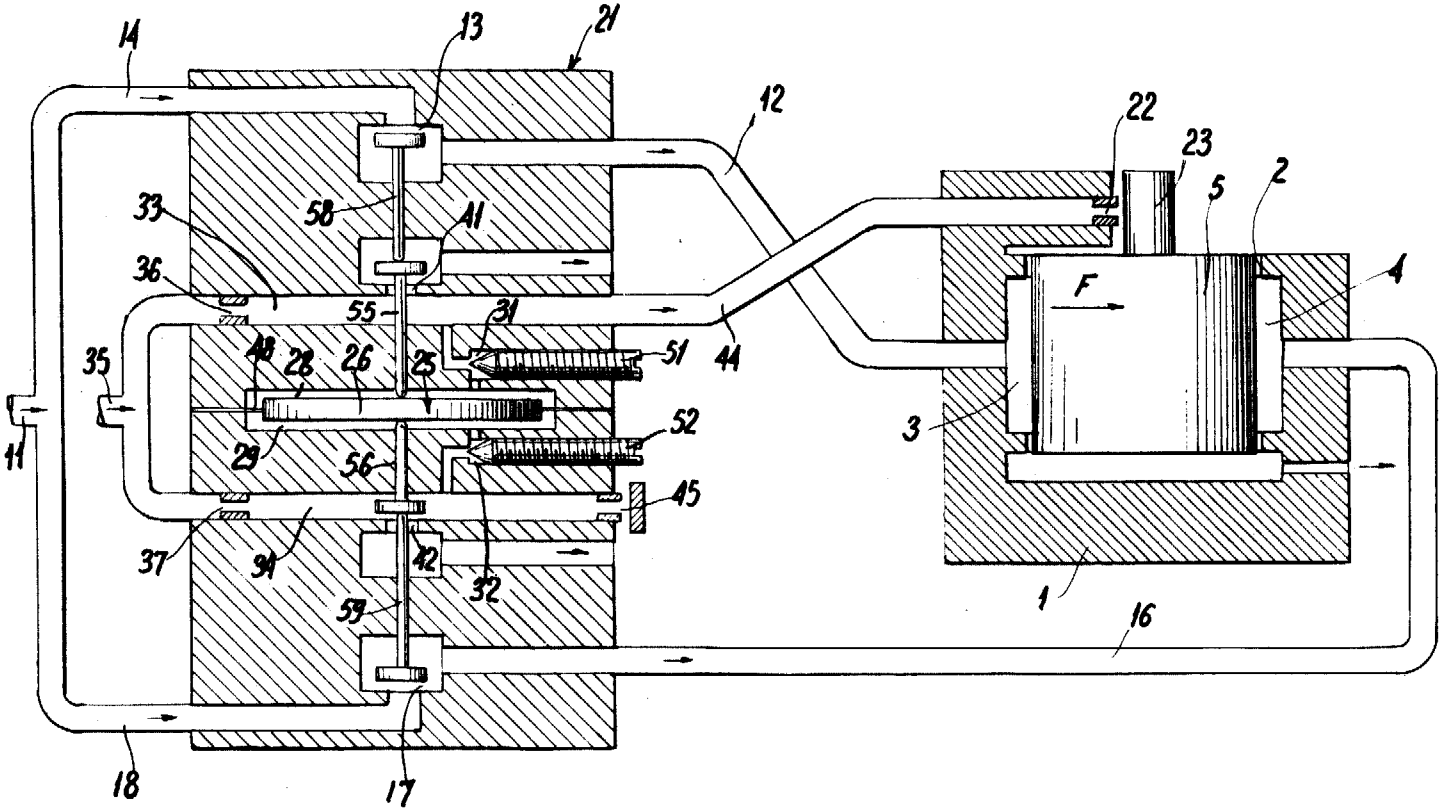

United States Patent Office

Re. 28,031
Reissued June 4, 1974

28,031

FLUID DEVICE FOR STABILIZING THE POSITION OF A MOVING ELEMENT

Andre Fortier, 12 Rue Leon Cambillard, Clamart 92, France

Original No. 3,697,142, dated Oct. 10, 1972, Ser. No. 30,510, Apr. 21, 1970. Application for reissue Mar. 22, 1973, Ser. No. 343,935

Claims priority, application France, Apr. 23, 1969, 6912767

**Int. Cl. F16c *1/24***

U.S. Cl. 308—5 R 4 Claims

Matter enclosed in heavy brackets [ ] appears in the original patent but forms no part of this reissue specification; matter printed in italics indicates the additions made by reissue.

ABSTRACT OF THE DISCLOSURE

There is described a pneumatic control system for varying pneumatic pressure on opposite sides of a pneumatic bearing so that a variable lateral force on a shaft supported by the bearing may be balanced so as to minimize undesirable lateral displacement of the shaft. The system includes a control device in which primary and secondary pneumatic circuits are separated by a movable diaphragm which moves along so as to vary the pressure on opposite sides of the bearing. The primary and secondary circuits are supplied with pneumatic fluid separately from a pneumatic supply for the bearing. The primary circuit pressure acts on one side of the diaphragm through a first adjustable throttle and responds to pressure variation produced by a sensing jet placed in close proximity to the shaft. The secondary circuit pressure acts on the opposite side of the diaphragm through a second adjustable throttle and contains a reference jet. Both primary and secondary circuits contain variable vents or restrictions to atmosphere which are simultaneously opened or closed depending upon the direction of diaphragm movement. All valve elements are independent members, but move simultaneously with the diaphragm. The system described enables a pneumatically supported shaft to be accurately position-controlled against displacement by lateral variable force.

The invention relates to the stabilization of the position of a moving body in relation to a fixed body by means of a device of the fluid bearing type, for example, that is by means of a pressurized fluid cushion held between these two bodies from a pressurized fluid source controlled by a distributor linked to the moving gear of a pneumatic differential control system itself controlled by a jet measuring the proximity of a surface of said moving body.

The differential control system is designed to ensure the control of the distributor in relation to the position of the moving body in such a way as to provide the bearing with great rigidity ratio of the force acting on the moving body to the displacement which it produces), without which the moving body, every time it is subject to a variation in the force or forces applied to it, would move by a significant amount before being returned to its reference position. To obtain a high degree of rigidity in the bearing, it is then necessary for the pneumatic differential system to have a high amplification coefficient, but it is then necessary to fit it with appropriate cushioning means in order that the whole unit remain stable. Moreover, in a static condition, that is when the force acting on the moving body does not vary, cushioning does not occur in the operation of the device but, in a dynamic state, that is when the force in question varies, too high a cushioning effect would greatly increase the response time of the device so that the distance between the two bodies might vary considerably more than in the static state for the same efforts involved.

It is therefore necessary to find a compromise such that the cushioning effect is great enough to ensure the stability of the apparatus but at the same time the response time of the gear in the dynamic state is as short as possible.

Hitherto attempts have been made to realize the cushioning by direct action on the distributor or on the moving gear of the pneumatic differential control system, for example by means of a dash-pot. A disadvantage with this procedure is that it considerably increases the weight of the gear to which is linked the moving element of the dash-pot and as a result increases the response time of the apparatus.

An object of the present invention is to obviate or mitigate the above disadvantage.

The aim of the invention is to create stabilizing apparatus of the type in question which presents at one and the same time a high amplification coefficient, a high cushioning effect, and very short response time whilst taking up very little space.

According to the present invention there is provided a process for the stabilization of the position of a moving body in relation to a fixed body by means of a device of the fluid bearing type, for example, that is by means of a cushion of pressurized fluid held between these two bodies from a pressurized fluid source under the control of a distributor linked to the moving gear of a pneumatic differential control system itself subject to the control of a jet for measuring the proximity of a surface of said moving part, wherein there is cushioning of the movements of the moving gear of the pneumatic differential control system by forcing the gas to act on said system through passages forming calibrated restrictions.

To this end, according to the invention, cushioning of the movements of the moving gear of the pneumatic differential control system is effected by forcing the gas to act on said system through passage forming calibrated restrictions.

The application of this principle does not involve the adding of any special element for obtaining the cushioning effect such as a dash-pot for example, whose moving element would be integral with the moving gear of the pneumatic differential system, so that said moving gear is not made any heavier and the apparatus has a rely time of very short duration; in addition, it can be realized in an extremely compact form.

To put the process of the invention into operation it is possible to use a standard type of fluid device of the type comprising a slide-valve for supplying fluid under pressure selectively to two opposing chambers separating the two bodies, and a control system for said slide valve comprising a fluid-tight movable partition connected to the slide valve and separating an enclosure into a primary chamber and a secondary chamber, linked respectively to a primary supply line and a second supply line which are themselves each linked on one hand to a pressurized gas source through two nozzles and, on the other, to the atmosphere through two throttles controlled by said slide valve so that their cross-sections vary together and in the same direction and, in the same way, the primary supply line being linked again to the atmosphere through a jet for measuring the proximity of the relative position of the two bodies whilst the secondary supply line is also linked again to the atmosphere through a reference jet.

According to the invention the device is characterized in that the primary and secondary supply lines mentioned are respectively linked to the primary and secondary chambers through passages forming calibrated restrictions and that the enclosure has the minimum volume compatible with the maximum clearance of the movable partition.

In an advantageous embodiment the slide valve and the two throttles controlled by said valve are constituted by a unit of four independent coaxial valves biased one against the other and against the movable partition mentioned.

An embodiment of the present invention will now be described by way of example with reference to the drawing which is a schematic representation, in section, of a fluid device according to the present invention.

In the drawing the fluid device is intended to effect the supply and control of a fluid bearing shown schematically in the form of part 1 having a bore 2 with two diametrically opposed chambers 3, 4 in which a cylindrical body 5 is mounted with rotation.

The chamber 3 can be linked to a pressurized fluid source 11 through a supply line 12, an adjustable restriction 13, and a tube 14. In similar manner the chamber 4 can be linked to the same pressurized fluid source through a supply line 16, an adjustable restriction 17, and a tube 18.

The stabilization of the position of the moving part 5 in relation to the fixed part 1 is effected by means of a suitable selective supply of fluid to the two chambers 3 and 4 by means of a controlling device designated generally by 21, which is itself regulated by a jet 22 mounted in the fixed part 1 and opening out near an auxiliary cylindrical surface 23 of the moving part 5, coaxial to the body of said part 1.

The control apparatus 21 which already comprises the two above mentioned restrictions 13 and 17, is constituted by a pneumatic differential control system comprising a fluid-tight movable partition 25 separating an enclosed space into a primary chamber 28 and a secondary chamber 29 linked respectively through two adjustable throttles 31, 32 to a primary supply line 33 and a secondary supply line 34 linked both, on the one hand, to a pressurized gas source 35 through two jets 36, 37 respectively, and on the other hand, to the atmosphere through two throttles with variable section 41, 42. The primary supply line 33 is linked, in addition, to the distance-testing jet 22 through a tube 44, whilst the secondary supply line 34 is also linked to the atmosphere through a reference jet 45.

In the embodiment shown the moving partition 25 comprises a rigid disc 26 whose periphery is linked to a flexible annular membrane 48 which helps to separate the two chambers 28 and 29 from each other.

The whole of the enclosure formed by the two chambers 28 and 29 presents the minimum volume compatible with the maximum clearances of the disc 26 that is, when the disc 26 moves upwards (in Fig 1.) to its maximum travel, it comes to bear against the top wall of the chamber 28 and then, when it reaches the end of its travel downwards, it comes in contact with the lower wall of the chamber 29. In addition, the possible clearances of the disc 26 are small and, for example, may be in the order of 0.1 mm. This arrangement, which pays a very important part in the apparatus, is intended to give to the two chambers 28 and 29 the smallest possible volume.

The two adjustable restrictions 31 and 32 are constituted, in this case, by two needle valves 51 and 52, accessible from the outside of the apparatus.

The two variable restrictions 41 and 42 comprise two valves 55, 56 which can slide in the body of the apparatus in a direction coaxial to the disc 26. The amount of play of the tail ends of the valves 55, 56 in their guides is very small and amounts, for example, to about 0.02 mm. The ends of the tailpieces of these two valves 55 and 56 abut respectively the upper and lower walls of the disc 26.

The two variable restrictions 13 and 17 are constituted also by valves 58, 59 coaxial to the preceding ones, and their tailpieces abut at the ends the two valves 55 and 56 respectively.

In operation, the disc 26 and the four valves, 55, 56, 58 and 59 form a unit which can only move as a complete unit since the two outer valves 58, 59 are subjected to the pressure from the source 11 through the tubes 14 and 18 respectively, and they bear against the two other valves 55 and 56 which bear in turn against the two opposite faces of the disc 26.

The whole of this movable gear is very light and any friction to which it is subjected is very slight, notably because the four valves are slide-mounted independently in the body of the apparatus so that even if the four valves are not absolutely coaxial they can slide without jamming since they are not integral with one another transversely.

The operation of the unit will now be described as follows:

When the unit is in equilibrium, the movable part 5 occupies, inside the fixed part 1, a reference position for which the distance-testing jet 22 is located at a predetermined distance from the part 23 of movable part 5. If, under the influence of a force F, part 5 moves, for example, in the direction of the base of the chamber 4, the restriction formed by the distance between the outlet of the jet 22 and the part 23 of the movable part increases in section and the pressure in the primary supply line 33 lowers which leads, through the restriction 31, to a lowering in the corresponding pressure in the chamber 28. The movable partition 25 and the other valves connected therewith move towards the top of the drawing, valve 58 rises and decreases the section of restriction 13 so that the pressure in the chamber 3 decreases as it mounts in the chamber 4 under the effect of the simultaneous rise of valve 59 and the correlated increase in section of the restriction 17. This variation in pressures in the two chambers 3 and 4 thus subjects the movable part 5 to a force opposing the force F and consequently tends to return the movable part 5 towards its reference position.

The cushioning effect of the movements of the movable gear connected to the movable partition 25 is effected in that the variations in pressure in the supply lines 33 and 34 cannot be transmitted to the disc 26 in the chambers 28 and 29 except through the restrictions 31 and 32 which are of very small section, for example 0.2 mm.$^2$. The cushioning effect is therefore obtained without adding any auxiliary organ such as a dash-pot linked to the movable gear which would have the disadvantage of considerably increasing the reply time of the control device.

In order that, under the effect of a variation of the force F, the movable part 5 may move very little and return rapidly to its reference position without causing any oscillations, it is necessary for the total volume of the primary circuit including the supply line 33, should be greater than the total volume of the secondary circuit including the supply line 34, and that the movements of the movable gear integral with the disc 26 should be suitably braked, but practically without any solid friction and without the risk of jamming, which is effected in the device just described.

If the restrictions 36 and 37, on the one hand, and 41, 42 on the other are equal, the body 5 can only occupy one position of equilibrium for which the restriction 22 is equal to the restriction 45, independent of the value of force F; the rigidity of the bearing is infinite. If the restriction 36 is greater than the restriction 37, the restrictions 41, 42 being equal the body 5 will move in the direction of the force P, that is the rigidity of the bearing is positive; it is negative when restriction 36 is smaller than restrictions 37.

Naturally the invention is not limited to the embodiment described and illustrated which was given by way of example; it is possible to make modifications to this, depending on the applications envisaged, without in so doing departing from the scope of the invention.

A modification to this embodiment is to arrange the valve 58 on the same side of the movable partition 25 as the valve 59, but it would then be necessary to provide means such as springs or fluid pressures capable of restoring to the whole movable gear comprising the disc 26 and the four valves 55, 56, 58, 59, the necessary cohesion to enable all these elements to move as a whole.

What I claim is:

1. A fluid device for stabilizing the position of a movable body in relation to a fixed body, of the type comprising two opposing chambers separating said two bodies, a slide valve for supplying pressurized fluid selectively to said two opposite chambers, and a control system for said slide valve comprising an enclosure, a gas tight movable partition connected to said slide valve and separating said enclosure into a primary chamber and a secondary chamber, a primary supply line and a secondary supply line, said primary and secondary chambers being connected respectively to said primary and secondary supply lines, said primary and secondary supply lines being connected to a pressurized gas source through two jets and open to the atmosphere through two throttles controlled by said slide valve so that the effective areas of said throttles vary together and in the same direction, said primary supply line being still open to the atmosphere by a jet measuring the proximity of the relative position of said two bodies, whilst said secondary supply line is also open to the atmosphere through a reference jet, said device being characterized by orifice means, respectively between (1) said primary line and said primary chamber and (2) said secondary line and said secondary chamber, said enclosure having a minimum volume compatible with the maximum deflections of said movable partition to limit the movement of said partition between extreme positions.

2. A device according to claim 1, wherein said slide valve and said two throttles controlled by said slide valve are constituted by a unit of four coaxial valves biased one against the other and against said movable partition.

3. A device according to claim 2, wherein said valves for controlling said two throttles have stems bearing respectively against the two opposite faces of said movable partition whilst the other two valves have stems bearing against said first two valves respectively under the action of the pressure of the fluid of which they control the supply towards said two opposing chambers separating said two bodies.

4. A device according to claim 1, wherein said calibrated restrictions are provided with means for regulating their effective areas and control members for actuating said regulating means, said control members being accessible from outside of the device.

References Cited

The following references, cited by the Examiner, are of record in the patented file of this patent or the original patent.

UNITED STATES PATENTS

| | | | |
|---|---|---|---|
| 3,403,948 | 10/1968 | Deffrenne | 308—122 |
| 3,099,995 | 8/1963 | Rauferbarth | 137—83 |
| 3,271,086 | 9/1966 | Deffrenne | 308—5 |
| 3,205,783 | 9/1965 | Deffrenne | 91—52 |

CHARLES J. MYHRE, Primary Examiner

R. H. LAZARUS, Assistant Examiner

U.S. Cl. X.R.

308—9, 122

UNITED STATES PATENT OFFICE

CERTIFICATE OF CORRECTION

Patent No. Re. 28031 Dated June 4, 1974
(reissue of U.S. Patent 3,697,142
Inventor(s)

It is certified that error appears in the above-identified patent and that said Letters Patent are hereby corrected as shown below:

Column 2, line 44, "passage" should be -- passages --;

line 52, "rely" should be -- reply --;

Column 3, line 62, "pays" should be -- plays --;

Column 4, line 73, "P" should be -- F --

Signed and sealed this 15th day of October 1974.

(SEAL)
Attest:

McCOY M. GIBSON JR.
Attesting Officer

C. MARSHALL DANN
Commissioner of Patents

UNITED STATES PATENT OFFICE

CERTIFICATE OF CORRECTION

Patent No. RE. 28,031 Dated June 4, 1974

Inventor(s) Andre Fortier

It is certified that error appears in the above-identified patent and that said Letters Patent are hereby corrected as shown below:

In the Abstract, line 8, "along" should read -- valves --; line 9, "pressure" should read -- pressures --.

Signed and sealed this 7th day of January 1975.

(SEAL)
Attest:

McCOY M. GIBSON JR.
Attesting Officer

C. MARSHALL DANN
Commissioner of Patents